United States Patent
Pighin

(10) Patent No.: US 9,645,241 B1
(45) Date of Patent: May 9, 2017

(54) USING DATA FROM NON-SURVEYED DEVICES TO GENERATE GEOPOSITIONING CORRECTIONS FOR PORTABLE DEVICES

(71) Applicant: GOOGLE INC., Mountain View, CA (US)

(72) Inventor: Fred P. Pighin, Sausalito, CA (US)

(73) Assignee: GOOGLE INC., Mountain View, CA (US)

( * ) Notice: Subject to any disclaimer, the term of this patent is extended or adjusted under 35 U.S.C. 154(b) by 1015 days.

(21) Appl. No.: 13/870,491

(22) Filed: Apr. 25, 2013

Related U.S. Application Data

(60) Provisional application No. 61/783,396, filed on Mar. 14, 2013.

(51) Int. Cl.
*G01S 19/07* (2010.01)
*G01S 19/41* (2010.01)

(52) U.S. Cl.
CPC .............. *G01S 19/07* (2013.01); *G01S 19/41* (2013.01)

(58) Field of Classification Search
CPC .......... G01S 19/40; G01S 19/41; G01S 19/42; G01S 19/50; G01S 5/009; G01S 5/0072; G01S 19/07
See application file for complete search history.

(56) References Cited

U.S. PATENT DOCUMENTS

| | | | | |
|---|---|---|---|---|
| 5,563,607 A * | 10/1996 | Loomis | ................... | G01S 19/07 342/357.44 |
| 5,886,666 A * | 3/1999 | Schellenberg | .......... | G01S 19/11 701/3 |
| 5,928,306 A * | 7/1999 | France | ................... | G01C 21/20 342/451 |
| 6,061,632 A * | 5/2000 | Dreier | .................... | G01S 19/07 342/357.48 |
| 6,138,074 A * | 10/2000 | Gower | .................... | G01S 19/07 342/357.21 |
| 6,275,707 B1 * | 8/2001 | Reed | ...................... | G01S 5/0072 342/357.31 |
| 2006/0017611 A1 * | 1/2006 | Hatch | ................... | G01S 5/0045 342/357.31 |
| 2007/0159383 A1 * | 7/2007 | Fleming | .................. | G01S 19/14 342/357.52 |
| 2010/0201569 A1 * | 8/2010 | Lee | ....................... | G01S 5/0036 342/357.42 |
| 2012/0139782 A1 * | 6/2012 | Gutt | ..................... | G01S 5/0072 342/357.24 |

* cited by examiner

*Primary Examiner* — Gregory C Issing
(74) *Attorney, Agent, or Firm* — Marshall, Gerstein & Borun LLP

(57) ABSTRACT

Positioning data generated by the positioning module of a portable device is received. The positioning data was generated using signals received at the portable receiver from respective signal sources (such as satellites). Positioning data generated by one or more non-surveyed devices is also received. The positioning data from the one or more non-surveyed devices has a high degree of reliability as compared with the position data from the portable device. The highly reliable positioning data from the one or more non-surveyed devices is further processed to develop positioning corrections for the portable device.

13 Claims, 5 Drawing Sheets

USING DATA FROM NON-SURVEYED DEVICES TO GENERATE GEOPOSITIONING CORRECTIONS FOR PORTABLE DEVICES

RELATED APPLICATION

This application claims the benefit of priority of U.S. Provisional Patent Application No. 61/783,396, filed Mar. 14, 2013, the contents of which are hereby incorporated by reference, in their entirety and for all purposes, herein.

FIELD OF TECHNOLOGY

The present disclosure relates generally to geographic positioning techniques and, more particularly, to real-time and/or post-processing corrections for position fixes generated by positioning modules of portable devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Portable devices with positioning modules, such as smartphones, tablet computer, or GPS receivers, commonly use multiple wireless signals to obtain a "position fix," or an estimate of the current geographic location. Generally speaking, a positioning module calculates the position fix by analyzing the time multiple signals take to reach the portable device from known locations. Portable devices may use signals from positioning satellites, such as those used in the global positioning system (GPS), mobile network transceivers, or wireless local area network (WLAN) routers, such as those used in a Wi-Fi-based positioning system (WPS), to facilitate positioning calculations.

Regardless of the signal source, portable devices attempting to calculate a position fix are prone to positioning errors due to obstructions along the signal paths. These obstructions may be atmospheric or terrestrial. Terrestrial objects, such as buildings or trees, may result in multipath reflections, while layers of the atmosphere may decelerate and refract signals, for example.

SUMMARY

According to one implementation, a method for improved geopositioning of a portable device equipped with a positioning module is implemented in a computing system on one or more processors. The method includes receiving first positioning data indicative of an estimated geographic location of the portable device, where the first positioning data was generated using positioning signals received at the portable device. The method also includes receiving second positioning data indicative of an estimated geographic location of a non-surveyed device, where the second positioning data was generated using positioning signals received at the non-surveyed device, and where the second positioning data has a higher degree of reliability than the first positioning data. The method further includes, using the one or more processors, determining that the portable device and the non-surveyed device have proximate estimated geographic locations and adjusting the estimated geographic location of the portable device using the first positioning data and the second positioning data.

In another implementation, a computing system improves geopositioning of a portable device. The system includes one or more processors and a computer-readable storage medium communicatively coupled to the one or more processors and storing a plurality of instructions. When executed on the one or more processors, the instructions cause the computing system to (i) receive first positioning data indicative of an estimated geographic location of the portable device, where the first positioning data was generated using positioning signals received at the portable device, (ii) obtain second positioning data corresponding to positioning signals received at a non-surveyed device near the estimated geographic location, approximately at a time when the positioning signals are received at the portable device, where the second positioning data has a higher degree of reliability than the first positioning data, and (iii) determine a corrected geographic location of the portable device using the first positioning data and the second positioning data.

In yet another implementation, a portable device comprises a positioning module configured to generate positioning data indicative of an estimated geographic location of the portable device, one or more processors, and a computer-readable storage medium communicatively coupled to the one or more processors and storing instructions. When executed on the one or more processors, the instructions cause the portable device to (i) transmit the positioning data to a network server, (ii) receive, from the network server, correction data generated using positioning signals received at a non-surveyed device at a location proximate to the estimated geographic location of the portable device, where the non-surveyed device is capable of estimating its geographic location with higher accuracy than the portable device, and (iii) apply the correction data to the positioning data to generate an adjusted estimated geographic location of the portable device.

DETAILED DESCRIPTION

The techniques of the present disclosure can be utilized to improve geopositioning in portable devices, such as smartphones, tablet computers, car navigation systems, portable GPS receivers, etc. Positioning corrections for portable devices are developed based on highly reliable positioning data from one or more nearby devices that do not have a permanent known position (referred to as non-surveyed devices in the following), and the highly reliable positioning data is stored on a remote positioning correction server accessible to both the non-surveyed devices and the portable device. The positioning data generated by the non-surveyed devices has a high degree of reliability (with respect to positioning data generated by the portable device) due to: (1) the non-surveyed device having sophisticated error correction hardware or software; and/or (2) the non-surveyed device being exposed to minor or few positioning errors.

Figure 1:
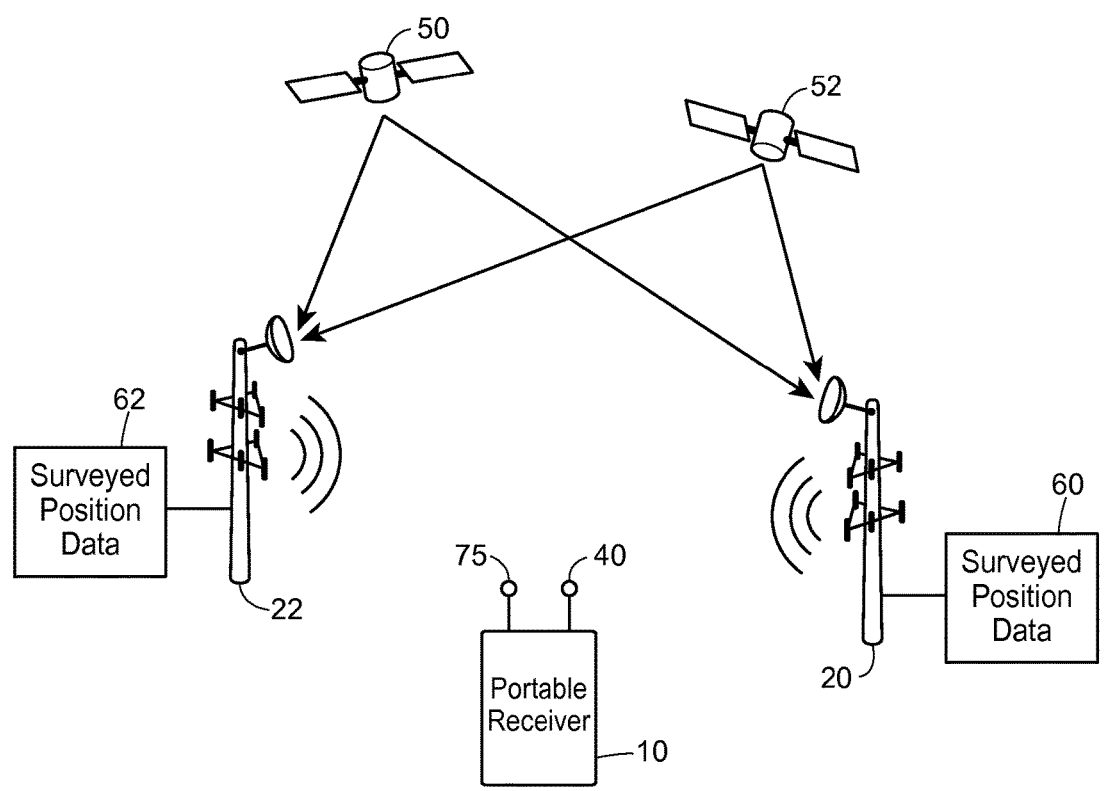
FIG. 1 illustrates scenario known system in which a portable device has access to differential global positioning system (DGPS) corrections via nearby DGPS base stations.

For clarity, FIG. 1 illustrates an example implementation of existing differential global positioning system (DGPS) techniques. In DGPS, a network of GPS base stations, such as base stations 20 and 22, having precise surveyed positions develop highly accurate positioning corrections for a set of satellite signals, such as signals from satellites 50 and 52. The positioning corrections are generated by performing a comparison, or optimization, between the positioning results of base station positioning modules and the surveyed base station positions (e.g. stored in the surveyed position databases 60 and 62). A portable device 10 at a nearby location attempting to generate a position fix can apply the base station generated corrections to improve geopositioning.

However, DGPS techniques are limited to geographic areas covered by a DGPS provider network of surveyed base stations. Also, even in areas covered by the provider network, a receiver may not have access to corrections when the provider network is experiencing technical difficulties. Moreover, to facilitate real-time corrections, the base stations 20 and 22 broadcast calculated positioning correction data on a dedicated radio frequency different from the frequency used by the satellites 50 and 52 to transmit positioning signals. The portable device 10 therefore needs a separate radio antenna 40 in addition to the satellite signal antenna 75. This need for dual antennas complicates the construction of the device and increases cost.

In contrast, the techniques of the present disclosure can utilize positioning data from any nearby portable or stationary device to develop positioning corrections for a portable device, even if the nearby device is a non-surveyed device. For example, the techniques of the present disclosure can utilize positioning data from a nearby non-surveyed device that has superior error correcting hardware or software, fewer sources of error, etc. As such, the techniques of the present disclosure are not limited to specific provider networks of surveyed devices, such as networks of DGPS base stations. In addition, the techniques of the present disclosure allow the portable device to access positioning correction data stored on a remote positioning correction server via a wireless protocol already implemented in the portable device.

Figure 2:
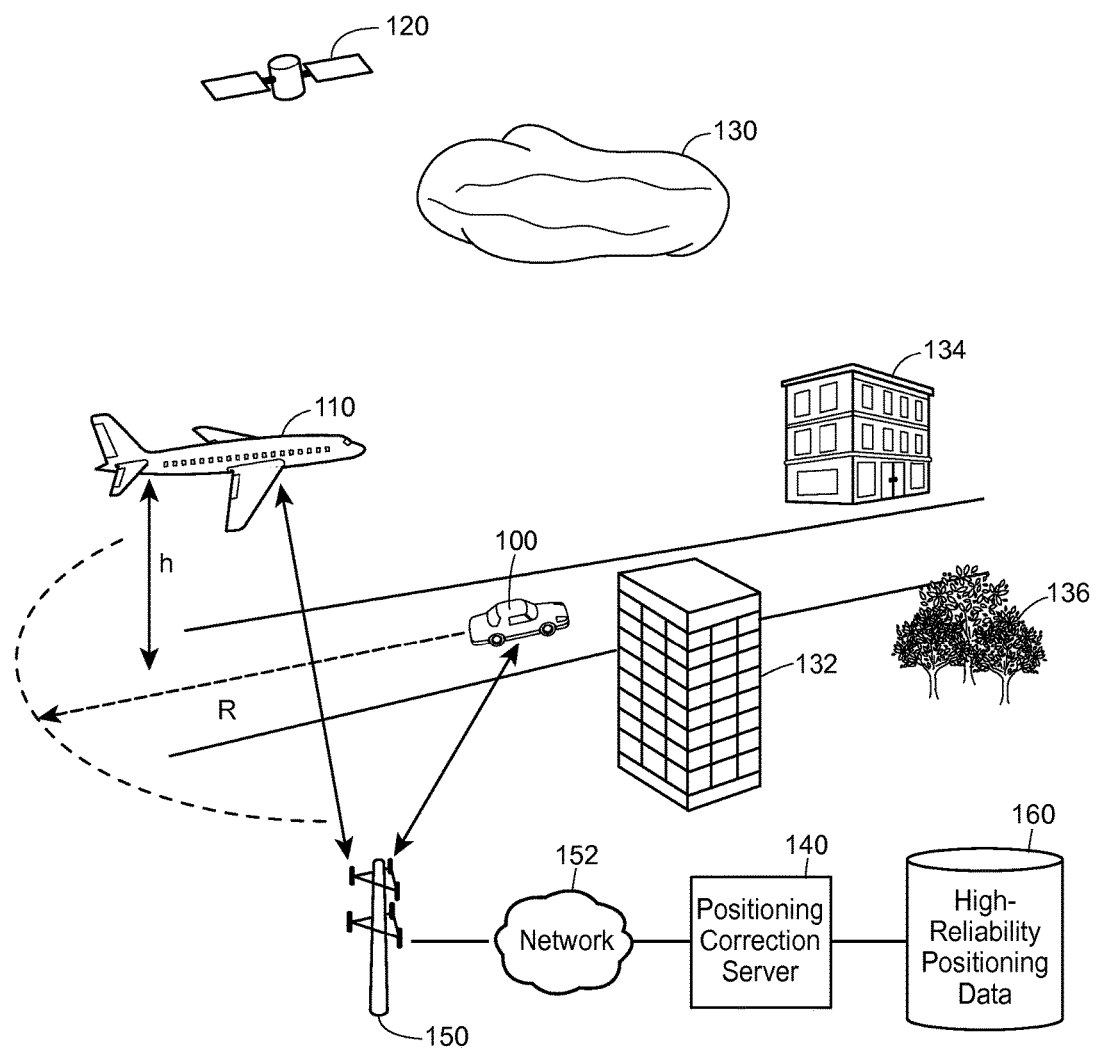
FIG. 2 illustrates an example environment in which a portable device improves geopositioning via high reliability positioning data generated by a non-surveyed device.

FIG. 2 illustrates an example environment in which a portable device improves geopositioning based on positioning data generated by a non-surveyed device. An example car 100 contains a positioning module (e.g., a GPS receiver) adapted to calculate approximate position fixes. An example aircraft 110 also is equipped with a positioning module, such as a positioning module that is part of a GPS positioning receiver or VHF omnidirectional radio range (VOR) system, for example. The aircraft 110 is a vertical distance h and horizontal distance R from the car 100.

The car 100 is travelling through an environment where certain obstructions may attenuate, occlude, or reflect positioning signals. Layers of the atmospheric and cloud formations, such as the cloud formation 130, may attenuate and/or decelerate a signal and the buildings 132 and 134 and trees 136 may either occlude signals or cause signal reflections, for example.

On the other hand, the aircraft 110 may be located at an altitude, h, such that most terrestrial obstacles, such as buildings and trees, have a negligible influence on geopositioning. Moreover, the aircraft 110 may be above portions of the atmosphere, such as portions of the troposphere, that further delay satellite signals as they travel to earth. As such, a positioning signal, such as a satellite signal, received by the aircraft 110 will have a high degree of reliability as compared with a signal received by the car 100. A GPS positioning module in an airplane at a cruising altitude of five or more miles above earth, for example, typically is not exposed to many sources of errors associated with atmospheric and terrestrial obstacles that are significant for a similar GPS positioning module on the surface of the earth.

Although not at the same geographic location, the example car 100 and the example aircraft 110 are separated by a small distance, $r=\sqrt{h^2+R^2}$, as compared with the height of the signal sources, such as the satellite 120. The distance r may be on the order of five to ten miles (where the aircraft 110 may be at cruising altitude), whereas a signal source, such as satellite 120, is very likely to be more than a thousand miles from the portable device. The locations of the portable device and non-surveyed device may be considered, in such a case, to be very close in reference to the distance between the portable device and the signal source. Thus, the highly reliable positioning data developed by the positioning module of the aircraft 110 can be applicable for generating positioning corrections for the positioning module of the car 100.

To facilitate the improvement of position fixes generated by the portable device, both the positioning module in the car 100 and the positioning module in the aircraft 110 may include one or more wireless interfaces (not shown) for communicating with an external positioning correction server 140. The wireless interfaces may be any interface appropriate for the purpose, including general-purpose wireless interfaces, as further described in reference to FIG. 5. The wireless interfaces may communicate with the positioning corrections server 140 via one or more antennas, such as the antenna 150, and a network cloud 152.

As positioning data is generated by the positioning module of the aircraft 110, the aircraft 110 may submit the positioning data, including positioning correction data, raw signal data, and position fixes, for example, to a high reliability positioning database 160. The positioning data generated by the positioning module of the aircraft 110 may include time stamps that indicate the time (e.g. in hours and minutes) at which signals were received by the positioning module of the aircraft 110 and/or aircraft flight information.

The positioning module in the car 100 may request positioning correction data by sending a correction query to the positioning correction server 140 before, during, or after attempting to obtain a position fix (the correction query will be discussed in more detail in reference to FIG. 5). In response to the correction query, the positioning correction server 140 searches the high reliability positioning database 160 for positioning data proximate in space to the approximate location of the car 100 and proximate in time to the time at which the positioning module in the car 100 acquired positioning signals. The positioning correction server 140 matches positioning data via time stamp or flight information contained in the high reliability positioning data 160. The positioning correction server 140 may use flight information contained in the high reliability positioning data 160 to obtain flight times and flight paths in an airline database that is accessible through a wide area network such as the internet, for example.

Upon matching a correction query with positioning data in the high reliability positioning database 160, the positioning correction server 140 may send the matched positioning data to the car 100. The positioning module of the car 100 may then further process the matched positioning data to develop corrections for one or more position fixes. Alternatively, the positioning correction server 140 may further process the matched positioning data to generate a corrected position fix for the car 100, and the corrected position fix may be sent in response to the correction query without a need for further processing by the positioning module of the car 100.

Figure 3:
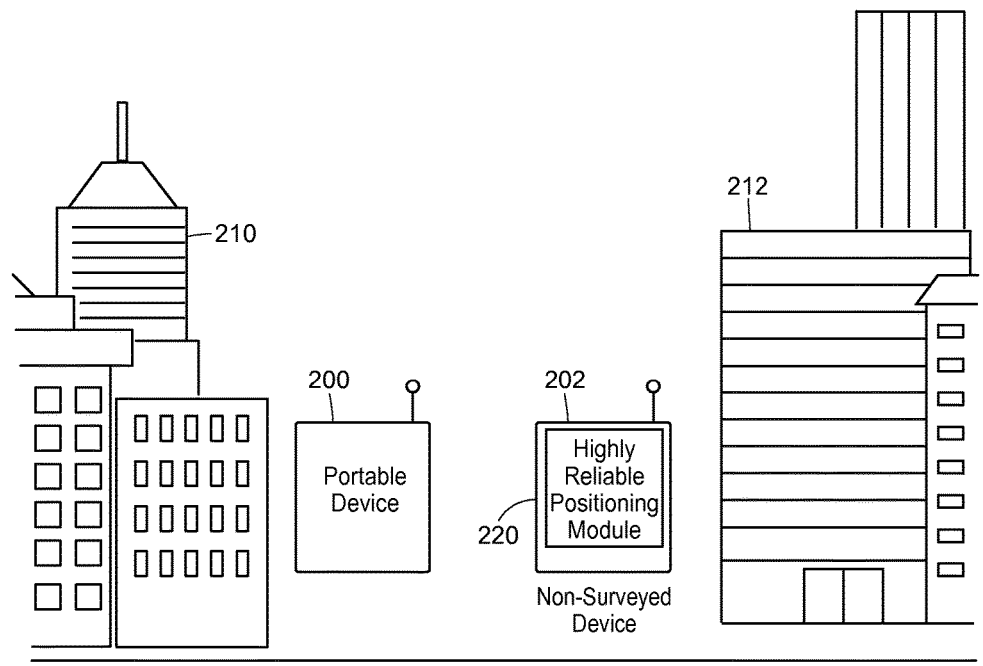
FIG. 3 illustrates an example scenario in which a portable device receives high reliability positioning data generated by a non-surveyed device with equivalent hardware.
Figure 6:
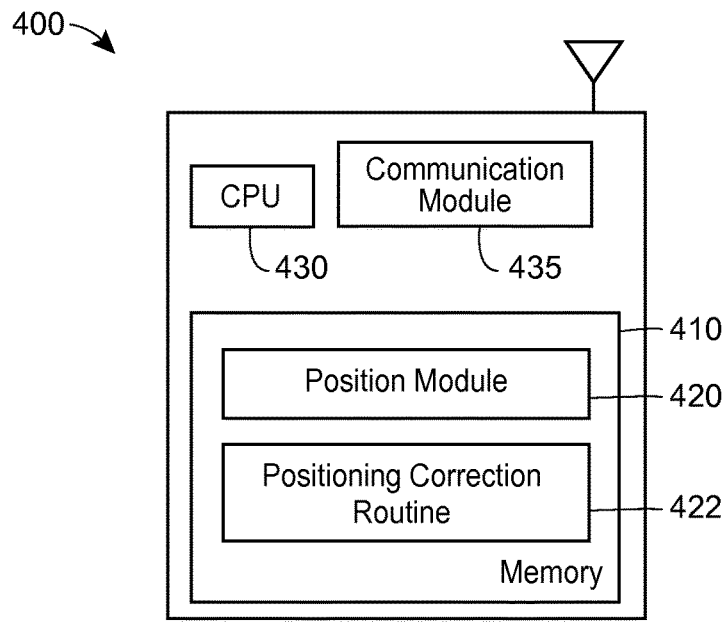
FIG. 6 illustrates an example portable device that can correct positioning data via a positioning correction routine.

FIG. 3 depicts another example scenario in which a portable device 200, such as the portable device discussed further in reference to FIG. 6, receives highly reliable positioning data for improved geopositioning from a nearby non-surveyed device 202. In this example scenario, the portable device 200 and the non-surveyed device 202 are smartphones or portable GPS receivers with equivalent (or similar) hardware, for example, and the non-surveyed device 202 and the portable device 200 are in similar physical environments.

Although the hardware may be similar, the non-surveyed device 202 has additional software that allows the non-surveyed device 202 to more accurately correct for positioning errors and consistently produce high reliability positioning data. Thus, the positioning module of the non-surveyed device 202 operates with a high degree of reliability (i.e. it is a highly reliable positioning module 220) compared to the positioning module of the portable device 200.

The geopositioning of portable device 200 may be improved by applying positioning corrections developed using the positioning data generated by the highly reliable positioning module 220. For example, positioning corrections developed by the highly reliable positioning module 220 address positioning errors that are very similar to the errors simultaneously occurring in positioning module the portable device 200. As such, the portable device 200 may improve geopositioning by an application of concurrent positioning corrections developed by the highly reliable positioning module 220, for example.

Figure 4:
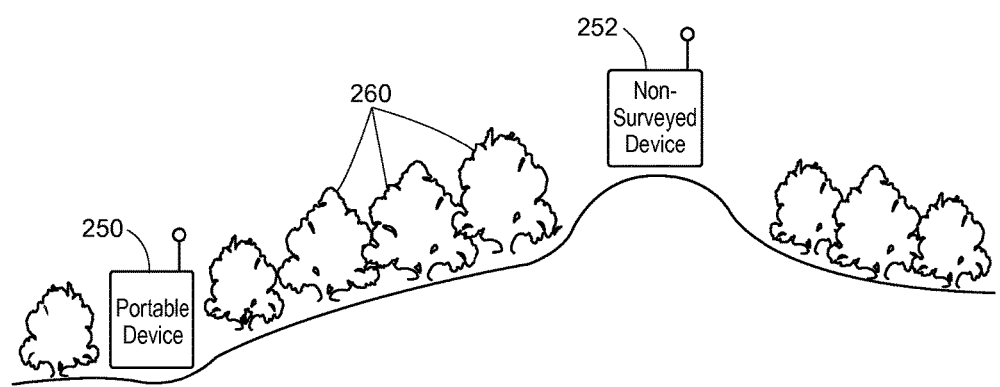
FIG. 4 illustrates an example scenario in which a portable device receives high reliability positioning data generated by a non-surveyed device with equivalent hardware and software.

FIG. 4 depicts an example scenario in which a portable device 250, such as the portable device discussed further in reference to FIG. 6, can receive positioning corrections from a non-surveyed device 252 with both equivalent hardware and software. The portable device 250 is located in a geographic area where signal occlusion is very likely, such a forested area with one or more trees 260. Even if the portable device 250 receives signals, the one or more trees 260 may cause multipath reflections which cause signal delay errors. On the other hand, the non-surveyed device 252 is located in a geographic area containing very few signal obstructions, such as a location on top of a hill or mountain, for example.

As part of the respective positioning modules, the portable device 250 and the non-surveyed device 252 may have software that indicates the probabilities of occlusion or signal interference. This software may analyze generated position corrections or scan databases containing historical signal reception data, for example. Thus, the non-surveyed device 252 can receive an indication of good signal reception and the portable device 250 can receive an indication of bad signal reception. Upon receiving an indication of good signal reception, the non-surveyed device 252 may broadcast high reliability positioning data via a wireless network such as a cellular telephone network, a wireless local area network (WLAN), or in any other suitable manner. Also, the portable device 250, upon receiving an indication of bad reception, may scan appropriate wireless networks for nearby non-surveyed devices that are broadcasting high reliability positioning data.

Therefore, the techniques of the present disclosure allow a portable device to receive positioning corrections based on high reliability data from a non-surveyed device. The hardware and/or software of the non-surveyed device may be equivalent to the hardware and/or software of the portable device, or the hardware and software of the non-surveyed device may be significantly different than that of the portable device. However, as discussed, networks of surveyed positioning base stations already exist in certain geographic areas. In these certain geographic areas, portable receivers may receive positioning corrections based on high reliability data from non-surveyed devices, surveyed devices, or a combination of both non-surveyed devices and surveyed devices.

Figure 5:
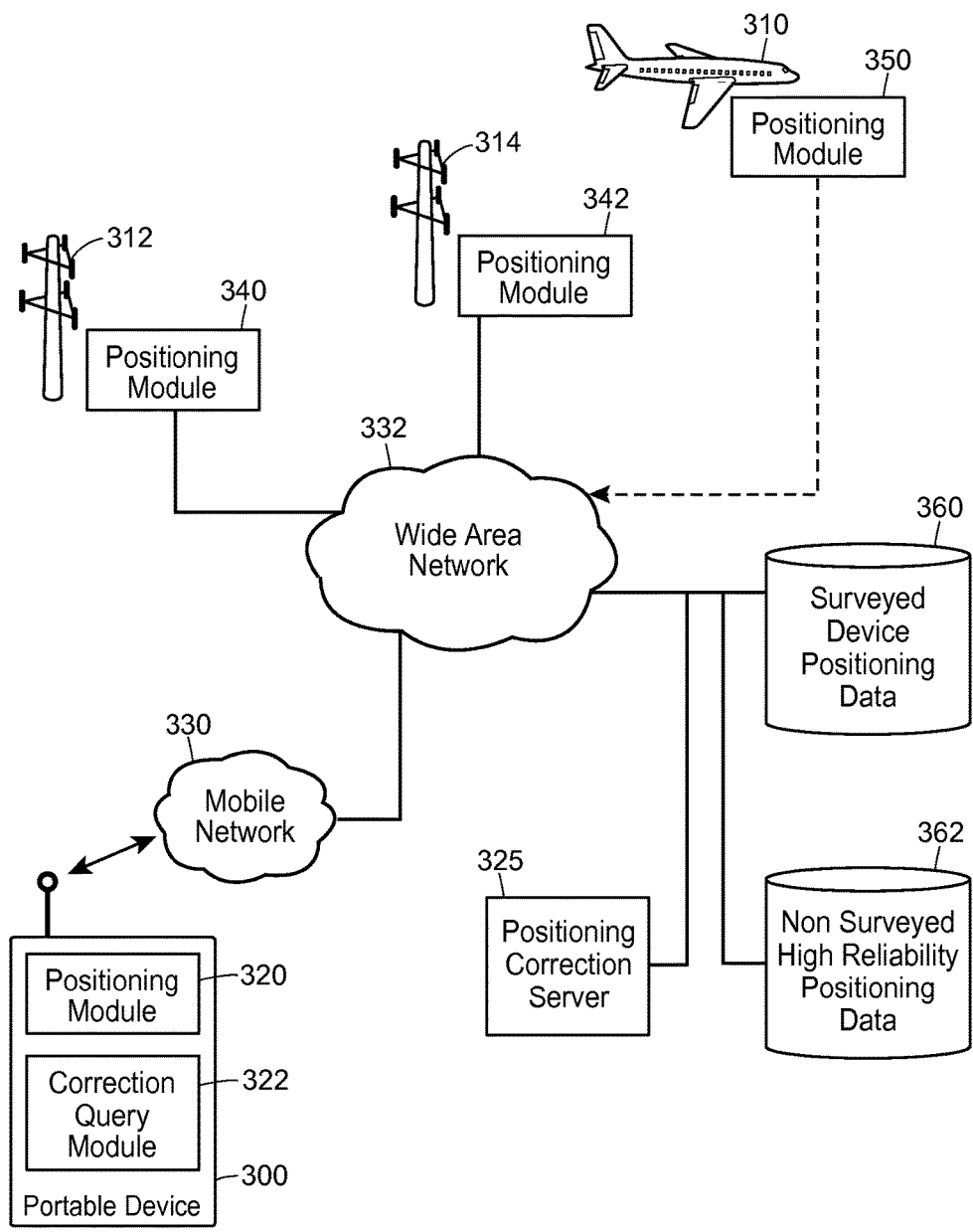
FIG. 5 illustrates an example computing system that improves the geopositioning of a portable device based on surveyed device positioning data and non-surveyed high reliability positioning data.

FIG. 5 illustrates an example computing system that improves geopositioning in a portable device 300 based on positioning data from non-surveyed devices (such as a non-surveyed device in an aircraft 310), surveyed devices (such as one or more base stations 312 and 314), or both non-surveyed and surveyed devices. The portable device 300 contains a positioning module 320 and a correction query module 322. The portable device may also include one or more wireless interfaces (not shown) for communicating with an external positioning corrections server 325 via one or more networks, such as a mobile network 330 and a wide area network 332. The wireless interfaces may be any interface appropriate for the purpose including, by way of example and without limitation, IEEE 802.11a/b/g/n/ac, mobile telephony, etc. The base stations 312 and 314 and the non-surveyed device 310 are also communicatively coupled to the wide area network 332 via one or more wireless interfaces. Alternatively, the base stations 312 and 314 may be communicatively coupled to the wide area network via a wired connection such as a coaxial cable, optical fiber cable, or twisted pair cable, for example.

The base stations 312 and 314 contain positioning modules 340 and 342 respectively, and the non-surveyed device in the aircraft 310 contains a positioning module 350. The positioning modules 340, 342, and 350 contain a hardware and/or software configuration that allows for the consistent calculation of high reliability positioning data, and/or the positioning modules 340, 342, and 350 are located in environments with few or minor sources of positioning error. The base stations 312 and 314 may send positioning data to the surveyed device positioning database 360 accessible via the wide area network 332, and the non-surveyed device 310 may send positioning data to the non-surveyed high-reliability positioning database 362 accessible through the wide area network 332. The positioning data from the base stations 312 and 314 and the non-surveyed device 310 are stored in the respective databases 360 and 362 on computer-readable storage media that can include both volatile and nonvolatile memory components.

To initiate improved geopositioning, the correction query module 322 in an example scenario develops and sends a correction query to the positioning correction server 325.

The correction query module 322 may use standard communication protocols such as TCP/IP or UDP/IP, for example. The correction query includes an approximate location of the portable device 300. The approximate location can be based on one or more uncorrected position fixes and a time stamp corresponding to the time at which signals, used to calculate the one or more uncorrected position fixes, were received by the portable device 300. Additionally, the correction query may contain device-specific information such as data formats recognized by the positioning module 320 or the manufacturer and model number of the portable device 300, for example. The correction query may include a request for correction data based on the surveyed device positioning data 360 only, the non-surveyed high reliability positioning data 362 only, or a combination of the two.

Upon receiving this correction query, the positioning correction server 325 obtains the appropriate surveyed device positioning data 360 and/or the non-surveyed high reliability positioning data 362. The positioning correction server 325 uses the time stamp and approximate location information included in the correction query to match appropriate high reliability positioning data with the current correction needs of the portable device 300.

As a more specific example, the correction query may indicate that the positioning module 320 requires high reliability positioning data from at least two surveyed or non-surveyed devices to accurately correct a position fix. In response to this correction query, the positioning correction server 325 may select high reliability positioning data from at least two proximate devices, regardless of whether these devices are surveyed or non-surveyed. In another example, the correction query may indicate that the positioning module 320 of the portable device 300 only needs high reliability positioning data from one device to accurately correct a position fix, and the same correction query may indicate a preference for high reliability positioning data generated by a non-surveyed device with a hardware configuration similar to that of the portable device 300. In response, the positioning correction server 325 would search the non-surveyed high reliability positioning database 362 for data from a non-surveyed device with similar hardware to that of the portable device 300.

FIG. 6 illustrates an example portable receiver 400 capable of improved geopositioning based on surveyed or non-surveyed high reliability positioning data. The example portable receiver 400 may be implemented as one of the portable receivers 200, 250, and 300. The portable receiver 400 contains a computer readable memory 410 in the form of volatile and/or nonvolatile memory such as read only memory (ROM) and random access memory (RAM). A positioning module 420 and a positioning correction routine 422 are stored in the memory 410 and executed by a CPU 430. The portable device 400 also contains a communication module 435.

The communication module facilitates wireless communication for positioning and data exchange over a mobile and/or wide area network. The communication module 435 may receive signals to be used for positioning and signals to be used for data exchange over a mobile and/or wide area networks. In another embodiment, the portable device 400 may have separate antennas for positioning and network communication. A positioning antenna may receive microwave positioning signals, for example, and a network communication antenna may receive and transmit signals for exchanging data over a mobile or wide area network, for example.

When attempting to calculate a position fix, the communication module 435 obtains a multiple positioning signals, such as signals from GPS satellites or signals from WLAN routers. The communication module 435 may provide the corresponding data to the positioning module 420. The CPU 430 executes the positioning module 420 with the input of data from the positioning signals to calculate a preliminary position fix. This preliminary position fix is likely to be of low reliability, but it does indicate an approximate location of the portable device 400.

The preliminary position fix is transferred to the positioning correction routine 422 which corrects for the errors that may exist in the preliminary position fix. To this end, the positioning correction routine may develop and send a correction query to a positioning correction server, such as one of the positioning correction servers 140 and 325.

In another implementation, the positioning correction routine 422 does not need to send a correction query to acquire positioning correction data. Nearby non-surveyed devices may broadcast high reliability positioning data directly to the portable device 400. When the portable device executes the positioning correction routine, software implemented in the communication module 435 may be executed to search for proximate non-surveyed devices generating high reliability positioning data. This search for proximate non-surveyed devices may consist of an active or passive broadcast signal, for example.

The positioning correction routine 422 uses the high reliability positioning data to correct the preliminary position fix and output an accurate position fix. The correction of the preliminary position fix may take the form of a direct position correction to the position coordinates, (x, y, z), with individual corrections for each coordinate, ($\Delta x$, $\Delta y$, $\Delta z$), for example. In this case, the corrected position fix would have the form (x+$\Delta x$, y+$\Delta y$, z+$\Delta z$). The position correction may also provide a direct correction, $\Delta t$, to the received signal time or an internal clock time. In some implementations, however, corrections to the preliminary position fix may take the form of indirect corrections (i.e. corrections that are not directly added to the position fix components). Indirect corrections to the position fix may include corrections to the raw data received by one or more satellites, filters for the incoming signals, or corrections to least square parameters, for example. These indirect corrections require the position module 420 to recalculate a position fix according to the corrected data, parameters, etc.

The techniques of this disclosure, therefore, correct positioning errors based on highly reliable positioning data available to a portable device, where the highly reliable positioning data may be generated by a surveyed or non-surveyed device.

Figure 7:
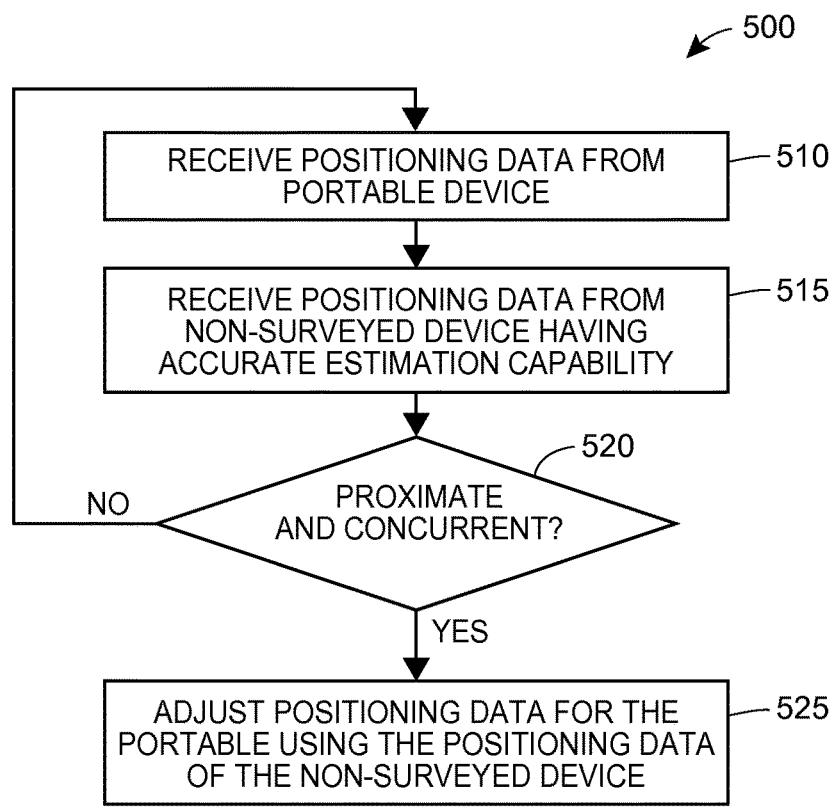
FIG. 7 is a flow diagram of an example method for adjusting the positioning data of a portable device using positioning data from a non-surveyed device.

Next, FIG. 7 illustrates an example method 500 for improving positioning data using the positioning data of a non-surveyed device. The method 500 may be implemented as computer readable instructed executed by a processor in a positioning correction server, such as the positioning correction servers 140 or 325, for example. However, a similar method also can be implemented in a portable device such as the portable receiver 450.

At block 510, positioning data from a portable device, such as one of the portable devices 200, 250, 300, or 400, is received. The positioning data includes an approximate geographic location of the portable device and a time stamp corresponding to the time that positioning signals were received by the portable device. Additionally, the positioning data may include device specific information such as model and manufacturer information, preferred data formats, etc.

Next (block 515), positioning data from a non-surveyed device maintaining a high level of reliability, such as one of the non-surveyed devices 220, 252, 312, and 314 or a non-surveyed device contained in one of the aircraft 110 and 310, is received. A positioning correction server may stores the positioning data from the non-surveyed device in a computer-readable storage medium accessible by the positioning data correction server. The positioning data from the non-surveyed device includes a time stamp indicating the time of positioning signal reception. Additionally, the positioning data may include flight information (if the non-surveyed device is implemented on an aircraft), device specific information, and information about the atmospheric and/or terrestrial environment of the non-surveyed device.

At block 520, the positioning data from the portable device and the positioning data from the non-surveyed device are compared. The comparison involves a comparison in both position and time. If the portable device and non-surveyed device have estimated locations (determined from one or more approximate position fixes) that are proximate, the comparison identifies the portable device and non-surveyed device as a possible match to improve the positioning of the portable device. The time at which the portable device and non-surveyed device acquired positioning signals, such as satellite signals, is also compared. In one example, the portable device and the non-surveyed device are identified as a possible match if the difference in signal times is below a pre-defined tolerance. In another implementation, the portable device and the non-surveyed device are identified as a possible match if the difference in signal times is small compared to other possible non-surveyed device matches.

The portable device and the non-surveyed device are determined to be a match if they are identified as potential matches in the time comparison and the position comparison. If there is a failure to match the portable device with a non-surveyed device, the method 500 reverts back to the beginning of the method (block 510). If, however, a match between the portable device and a non-surveyed device is achieved, the method continues to block 525.

At block 525, the positioning data from the non-surveyed device is used to adjust the positioning data of the portable device to achieve a higher degree of reliability. The adjustment of the positioning data may take the form of direct additive corrections to a position fix. In other examples, the form of the adjustments to the positioning data may be indirect. The adjustment, for example, may consist of adjustments to raw satellite data. In the case of such indirect adjustments, a positioning routine must be run with the adjusted positioning data to develop a new position fix with a high degree of reliability.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for accounting for atmospheric and terrestrial obstacles in geographic positioning through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method for improved geopositioning of portable devices equipped with positioning modules, the method comprising:

receiving, by one or more processors at a network server, via a first wireless communication link, a correction query from a portable device, the correction query including first positioning data indicative of an estimated geographic location of the portable device and a corresponding time stamp, wherein the first positioning data was generated using satellite positioning signals received at the portable device;

obtaining, by the one or more processors at the network server, correction data for adjusting the estimated geographic location of the portable device, including:

receiving second positioning data indicative of an estimated geographic location of a non-surveyed device and a corresponding second time stamp, including receiving an indication that the non-surveyed device is located at a cruising aircraft, via a second wireless communication link, wherein the second positioning data was generated using satellite positioning signals received at the non-surveyed device, storing the second positioning data and the second time stamp in a database, obtaining flight path and flight times for the cruising aircraft;

determining, using the obtained flight path and flight times, that the portable device and the non-surveyed device have proximate estimated geographic locations at proximate times, including comparing the first time stamp to the second time stamp, and generating, using the second positioning data, the correction data for adjusting the estimated geographic location of the portable device, using the second positioning data; and providing the correction data from the network server to the portable device.

2. The method of claim 1, wherein comparing the first time stamp to the second time stamp includes determining whether a difference between the timestamps is within a tolerance range.

3. The method of claim 1, wherein the satellite positioning signals are associated with a Global Positioning Service (GPS).

4. The method of claim 3, wherein generating the correction data includes applying a differential GPS technique.

5. The method of claim 1, wherein determining that the portable device and the non-surveyed device have proximate estimated geographic locations includes determining that the first positioning data and the second positioning data specify respectively a first geographic location and a second geographic location, wherein the first geographic location and the second geographic location have similar latitude and longitude but different altitudes.

6. The method of claim 5, wherein the first estimated geographic location is at or near a ground level.

7. The method of claim 1, wherein determining that the portable device and the non-surveyed device have proximate estimated geographic locations includes:

determining a horizontal distance between the estimated geographic locations of the portable device and the non-surveyed device measured along a surface of the Earth, and comparing the determined horizontal distance to a threshold value.

8. The method of claim 1, further comprising determining, using the one or more processors, that the first positioning data and the second positioning data were captured at substantially the same time.

9. A network server for improving geopositioning of portable devices, the system comprising:

one or more processors; and a computer-readable storage medium communicatively coupled to the one or more processors and storing a plurality of instructions that, when executed on the one or more processors, cause the computing system to:

receive, from a portable device via a first wireless communication link, a correction query including first positioning data indicative of an estimated geographic location of the portable device and a corresponding first time stamp, wherein the first positioning data was generated using satellite positioning signals received at the portable device, obtain correction data for adjusting the estimated geographic location of the portable device, including:

receive second positioning data indicative of an estimated geographic location of a non-surveyed device and a corresponding second time stamp, including an indication that the non-surveyed device is located at a cruising aircraft, wherein the second positioning data was generated using satellite positioning signals received at the non-surveyed device, store the second positioning data and the second time stamp in a database, obtain flight path and flight times for the cruising aircraft, determine, using the obtained flight path and flight times, that the portable device and the non-surveyed device have proximate estimated geographic locations, including compare the first time stamp to the second time stamp, and generate, using the second positioning data, the correction data for adjusting the estimated geographic location of the portable device, wherein the instructions further cause the computing system to:

provide the correction data to the portable device via the first wireless communication link.

10. The network server of claim 9, wherein to determine the correction data, the instructions cause the computing system to apply a differential GPS technique.

11. A system comprising:

a network server configured to receive satellite positioning signals from at a non-surveyed device located at a cruising aircraft and corresponding first time stamps, the satellite positioning signals indicative of an estimated geographic location of the non-surveyed device;

a database, wherein the network server stores the received satellite positioning signals and with the corresponding first time stamps in the database; and a portable device including a positioning module configured to generate positioning data indicative of an estimated geographic location of the portable device, the portable device configured to:

transmit the positioning data to a network server and a corresponding second time stamp, receive, from the network server, correction data generated using the satellite positioning signals stored in the database, and apply the correction data to the positioning data to generate an adjusted estimated geographic location of the portable device, wherein the network server is further configured to:

obtain flight path and flight times for the cruising aircraft, and determine that the portable device and the non-surveyed device have proximate estimated geographic locations using the obtained flight path and flight time, including compare the first time stamps to the second time stamp.

12. The system of claim 11, wherein the positioning module generates the positioning data at approximately the same time as the non-surveyed device receives the positioning signals.

13. The system of claim 11, wherein the non-surveyed device is portable.

\* \* \* \* \*